United States Patent
Chow et al.

(10) Patent No.: US 7,170,908 B2
(45) Date of Patent: Jan. 30, 2007

(54) SYSTEM AND METHOD OF SELECTING SOURCES FOR A NETWORK ELEMENT HAVING REDUNDANT SOURCES

(75) Inventors: Joey Chow, Nepean (CA); Joe Cote, Carleton Place (CA)

(73) Assignee: Alcatel Canada Inc., Kanata (CA)

( * ) Notice: Subject to any disclaimer, the term of this patent is extended or adjusted under 35 U.S.C. 154(b) by 182 days.

(21) Appl. No.: 10/015,572

(22) Filed: Dec. 17, 2001

(65) Prior Publication Data
US 2003/0061199 A1    Mar. 27, 2003

(30) Foreign Application Priority Data
Sep. 27, 2001    (CA) .................................. 2357931

(51) Int. Cl.
G06F 11/00    (2006.01)
G06F 7/30    (2006.01)
H04J 3/04    (2006.01)

(52) U.S. Cl. .......................... 370/536; 370/323; 707/2
(58) Field of Classification Search ................... 707/2; 370/232, 536
See application file for complete search history.

(56) References Cited

U.S. PATENT DOCUMENTS

| | | | |
|---|---|---|---|
| 5,268,909 A | | 12/1993 | Loebig |
| 5,428,745 A | * | 6/1995 | de Bruijn et al. ................ 726/3 |
| 5,436,915 A | | 7/1995 | Loebig |
| 5,568,615 A | * | 10/1996 | Sederlund et al. ........... 709/213 |
| 5,699,369 A | * | 12/1997 | Guha ........................... 714/774 |
| 5,712,854 A | * | 1/1998 | Dieudonne et al. .......... 370/536 |
| 5,761,191 A | * | 6/1998 | VanDervort et al. ......... 370/232 |
| 5,764,626 A | * | 6/1998 | VanDervort .................. 370/232 |
| 5,950,201 A | * | 9/1999 | Van Huben et al. ........... 707/10 |
| 6,052,803 A | * | 4/2000 | Bhatia et al. .................. 714/49 |
| 6,108,410 A | * | 8/2000 | Reding et al. ........... 379/265.03 |
| 6,201,811 B1 | * | 3/2001 | Larsson et al. ........... 370/310.1 |
| 6,798,740 B1 | * | 9/2004 | Senevirathne et al. ...... 370/219 |
| 6,856,600 B1 | * | 2/2005 | Russell et al. .............. 370/244 |
| 6,944,123 B1 | * | 9/2005 | Moon .......................... 370/216 |
| 6,970,451 B1 | * | 11/2005 | Greenberg et al. .......... 370/352 |
| 2002/0016933 A1 | * | 2/2002 | Smith et al. .................... 714/4 |

FOREIGN PATENT DOCUMENTS

WO    WO 94/18769    8/1994

* cited by examiner

Primary Examiner—Jeffrey Gaffin
Assistant Examiner—Cindy Nguyen
(74) Attorney, Agent, or Firm—Marks & Clerk; Richard J. Mitchell

(57) ABSTRACT

A source selection system for a communication switch for selecting a primary datasource from a plurality of datasources is provided. The system includes a validation module associated with the plurality of datasources adapted to monitor each datasource of the plurality of datasources for transmission errors in output originating from each datasource and adapted to provide information relating to the transmission errors. The system also includes a source selector associated with the validation module and the plurality of datasources, the source selector adapted to select an output datasource from the plurality of datasources. The system further includes an assessment module associated with the validation module adapted to identify the primary datasource from the plurality of datasources utilizing the information provided by the validation module and adapted to cause the source selector to select the output datasource associated with the primary datasource.

18 Claims, 18 Drawing Sheets

SYSTEM AND METHOD OF SELECTING SOURCES FOR A NETWORK ELEMENT HAVING REDUNDANT SOURCES

FIELD OF THE INVENTION

The invention relates to a system and method of selecting a source in a communication device having redundant sources.

BACKGROUND OF INVENTION

Communications switch and router systems need to provide a low failure rate for communication routing and transmission. Many systems use an architecture which provides redundant communication capabilities to switch away from failures when they occur. A common reliability measure is whether or not the system provides six 9's reliability, i.e. is available 99.9999% of a given time period. This requires rapid fault detection and correction.

Prior art systems provide redundancy for a primary source element in a communication switch. A validation module assesses the health of the primary source. When the validation module determines that the health of the primary source has deteriorated below a defined threshold, a switch is made to make the redundant source the primary source.

However prior art systems do not consider a scenario where the redundant source has a relative health worse than the primary source. In that scenario, if a switch is made, the new primary source provides worse service than the original primary source. Switching to a redundant source in this case may result in unavailability of the communications device, adversely affecting its reliability percentage.

There is a need for a system and method providing switching redundancy that improves upon the prior art systems.

SUMMARY OF INVENTION

In a first aspect, a source selection system for a communication switch for selecting a primary datasource from a plurality of datasources is provided. The system includes a validation module associated with the plurality of datasources adapted to monitor each datasource of the plurality of datasources for transmission errors in output originating from each datasource and adapted to provide information relating to the transmission errors. The system also includes a source selector associated with the validation module and the plurality of datasources, the source selector adapted to select an output datasource from the plurality of datasources. The system further includes an assessment module associated with the validation module adapted to identify the primary datasource from the plurality of datasources utilizing the information provided by the validation module and adapted to cause the source selector to select the output datasource associated with the primary datasource.

The validation module may include a plurality of validation sub-modules, each one of the plurality of validation sub-modules associated with one of the plurality of datasources.

The validation module may perform an integrity check on data transmitted by each datasource to provide information relating to transmission errors for each datasource.

The assessment module may evaluate severity of the transmission errors provided in the information and cause the source selector to select the output datasource associated with the primary datasource based on the severity of the transmission errors for each of the plurality of datasources.

The integrity check on the data may include a parity check and a cyclic redundancy check. The integrity check may be performed on a payload portion of the data. The integrity check may be performed on a header portion of the data.

The communication switch may include a plurality of output cards and an input card, each one of the plurality of datasources originating from one of the plurality of output cards and the source selector operating at input to the input card. At least one of the output cards may include a component and the integrity check is performed upon the data being received by the component in the at least one of the output cards of the communication switch. The source selector may be a multiplexer.

In a second aspect, a method of selecting a primary datasource from a plurality of datasources in a communication switch is provided. The method includes the step of receiving data from each datasource of the plurality of datasources. The method also includes the step of monitoring each datasource for transmission errors originating in output from each datasource. The method further includes the step of identifying the primary datasource from the plurality of datasources utilizing information relating the transmission errors for each datasource.

In other aspects, the invention provides various combinations and subsets of the aspects described above.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF THE EMBODIMENTS

Figure 1A:
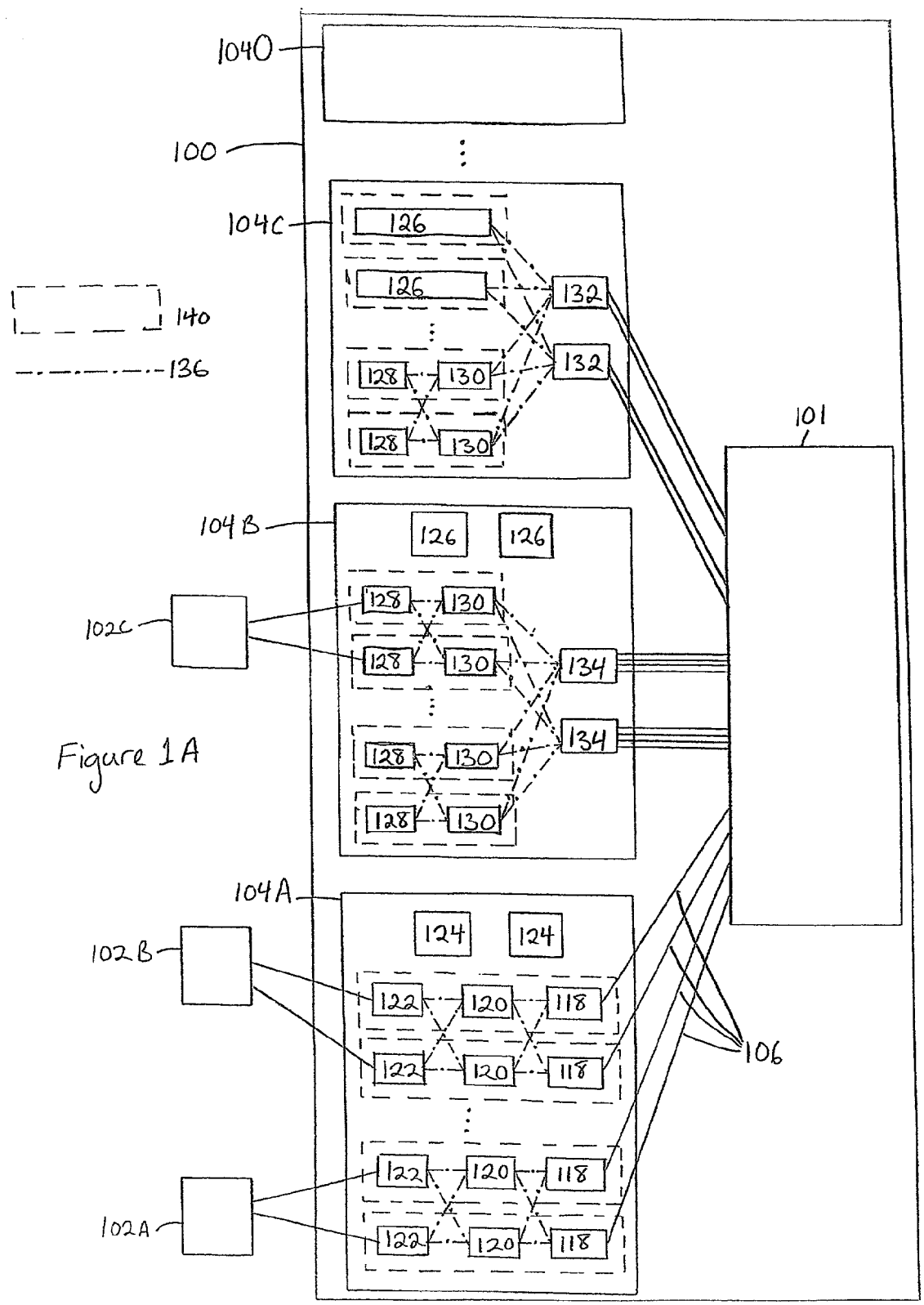
FIG. 1A is a block diagram of components and connections of the routing switch of the embodiment of the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

1.0 Basic Features of System

Briefly, the system of the embodiment provides a means for assessing and selecting a source between a primary source and a redundant source for a routing switch in a communication network. The system evaluates the health of the primary source and the redundant source of the routing switch. From the evaluation, the system determines whether and when to switch the source between the primary source and the redundant source.

2.0 Prior Art

Figure 2:
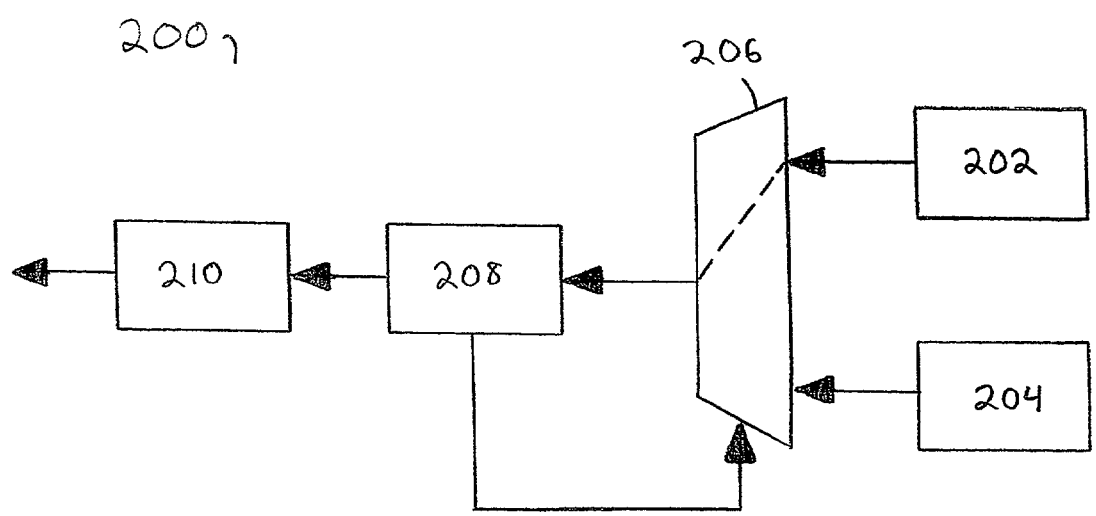
FIG. 2 is a block diagram of aspects of a routing switch embodying prior art.

Referring to FIG. 2, system 200 is a prior art system which selects between a primary source 202 and a redundant source 204. System 200 comprises multiplexer 206, validation module 208 and processing block 210.

In normal operation, primary source 202 has been selected by a validation module 208 to provide its functionality to circuit 200. Accordingly, validation module 208 provides a control signal to multiplexer 206 to ensure that the output of primary source 202 is provided to processing block 210, through validation block 208. As the output of primary source 202 is processed by validation block 208, the health of the data provided by primary source 202 is evaluated. If validation module 208 determines that the health of the data provided by primary source 202 has deteriorated below a predetermined threshold, then primary source 202 is no longer viable as a source. Accordingly, validation module 208 switches the data source to redundant source 204. This is accomplished by providing an appropriate control signal to multiplexer 206 to cause the source of the data to be switched from primary source 202 to redundant source 204. Thereafter, data flows from redundant source 204 through multiplexer 206 through validation module 208 to processing block 210.

It will be appreciated that the prior art circuit 200 does not monitor the health of the redundant source.

3.0 System Architecture

The following is a description of part of a network associated with the routing switch associated with the embodiment.

Figure 1B:
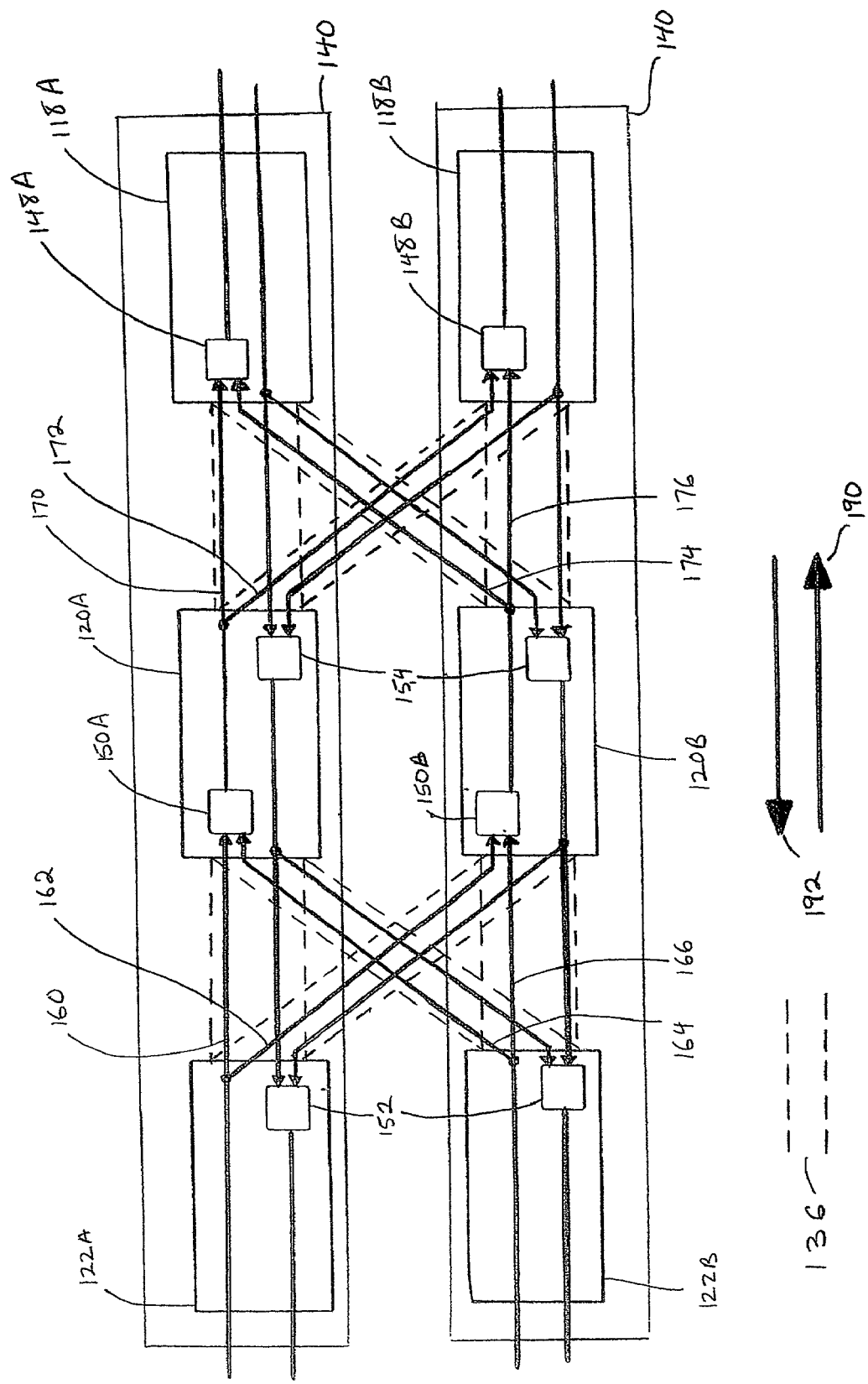
FIG. 1B is a block diagram of the redundant system of the I/O shelf of FIG. 1A.

Referring to FIG. 1, routing switch 100 is a multi-protocol backbone system, which can process both ATM cells and IP traffic through its same switching fabric. In the present embodiment, routing switch 100 allows scaling of the switching fabric capacity by the insertion of additional shelves and cards into the multishelf switch system.

Routing switch 100 is a multi-shelf switching system enabling a high degree of re-use of single shelf technologies. Routing switch 100 comprises a switching core 101 and I/O shelves 104A, 104B, 104C, . . . 104O, (providing a total of 15 I/O shelves) and the various shelves and components in switch 100 communicate with each other through data links. Switching core 101 provides cell switching capacity for routing switch 100. I/O shelves 104 provide I/O for routing switch 100, allowing connection of devices, like customer premise equipment (CPEs) 102A, 102B, and 102C to routing switch 100.

Communication links enable switching core 101 and I/O shelf 104 to communicate data and status information with each other. High Speed Inter Shelf Links (HISL) 106 link switching core 101 with I/O shelves 104. Switching core 101 communicates with the rest of the fabric through High Speed Fabric Interface Cards (HFICs) 118 and Peripheral Fabric Interface Cards (PFICs) 132 and 134 on the I/O shelves 104.

A terminal (not shown) is connected to routing switch 100 and runs controlling software, which allows an operator to modify and control the operation of routing switch 100.

There are two types of I/O shelves 104. The first type is a High Speed Peripheral Shelf (HSPS), represented as I/O shelf 104A. I/O shelf 104A contains High Speed Line Processing Cards (HLPC) 120, I/O cards 122, HFICs 118 and two redundant High Speed Shelf Controller (HSC) cards 124. In the embodiment, I/O cards 122 are connected to HLPCs 120 and HLPCs 120 are connected to HFICs 118 using a midplane connection 136. In the embodiment, signals transmitted through midplane connections 136 use Low Voltage Differential Signalling (LVD signalling) which indicate binary signals by positive and negative voltage values about 0 volts.

The second type of I/O shelf contains I/O cards 128, Line Processing Cards (LPC) 130 and PFICs 132 or 134. The PFICs are either configured as Dual Fabric Interface Cards (DFIC), as shown in PFICs 132 of I/O shelf 104C, or Quad Fabric Interface Cards (QFIC), as shown in PFICs 134 of I/O shelf 10413. I/O shelves 104B and 104C also have two shelf controllers 126 each. In the embodiment, I/O cards 128 are connected to LPCs 130 and LPCs 130 are connected to PFICs 132 or 134 using a midplane connection 136.

Routing switch 100 incorporates the redundancy scheme of the embodiment. As can be seen from FIG. 1A, I/O shelves 104B and 104C provide for 1+1 redundancy for I/O cards 128, LPCs 130, PFICs 132 and PFICs 134. Referring to FIG. 11B, the redundancy scheme of I/O shelf 104A is illustrated in greater detail. In the embodiment, redundancy is provided between pairs of adjacent slots 140 in I/O shelf 104A. As mentioned previously, I/O cards 122A and 122B are connected to both HLPCs 120A and 120B using midplane connections 136. HLPCs 120A and 120B are also connected to both HFICs 118A and 118B using midplane connections 136. I/O shelf 104A provides 1+1 redundancy for I/O cards 122, HLPCs 120 and HFICs 118 by this cross-connection of cards.

In the ingress direction (shown by arrow 190), I/O card 122A provides data to HLPC 120A, shown by arrow 160, and to HLPC 120B, shown by arrow 162. Similarly, I/O card 122B provides data to HLPC 120A, shown by arrow 164, and to HLPC 120B, shown by arrow 166. Data arrives from I/O cards 122A and 122B at circuit 150A in HLPC 120A. Similarly, data arrives from I/O cards 122A and 122B at circuit 150B in HLPC 120B. Circuit 150 in the active HLPC 120 chooses which of I/O cards 122A and 122B is the primary source and provides its functionality to active HLPC 120. The non-selected I/O card 122 is the redundant source. Active HLPC 120 processes data from the chosen active I/O card 122. Circuit 150 in the inactive HLPC 120, as the redundant HLPC 120, also chooses active I/O card 122 and processes data from that card.

After processing, HLPC 120A provides data to HFIC 118A, shown by arrow 170, and to HFIC 120B, shown by arrow 172. Similarly, HLPC 120B provides data to HFIC 118A, shown by arrow 174, and to HFIC 120B, shown by arrow 176. Data arrives from HLPCs 120A and 120B at circuit 148A in HFIC 118A. Similarly, data arrives from HLPCs 120A and 120B at circuit 148B in HFIC 118A. Circuit 148 in the active HFIC 120 chooses which of HLPCs 120A and 120B is the primary source and provides its functionality to active HFIC 118. The non-selected HLPC 120 is the redundant source. Active HFIC 118 processes data from the chosen active HLPC 120. Circuit 148 in the inactive HFIC 118, as the redundant HFIC 118, also chooses active HLPC 120 and processes data from that card.

In a similar manner, in the egress direction (shown by arrow 192), circuits 152 in I/O cards 122 choose the primary source from HLPCs 120A and 120B and circuits 154 in HLPCs 120 choose the primary source from HFICs 118A and 118B.

Although illustrated in relation to a high speed peripheral shelf, I/O shelf 104A, it will be appreciated that I/O shelves 104B and 104C operate with a similar redundancy scheme.

It will be appreciated that terms such as "routing switch", "communication switch", "communication device", "switch", "network element" and other terms known in the art may be used to describe routing switch 100. Further, while the embodiment is described for routing switch 100, it will be appreciated that the system and method described herein may be adapted to any switching system.

Figure 3:
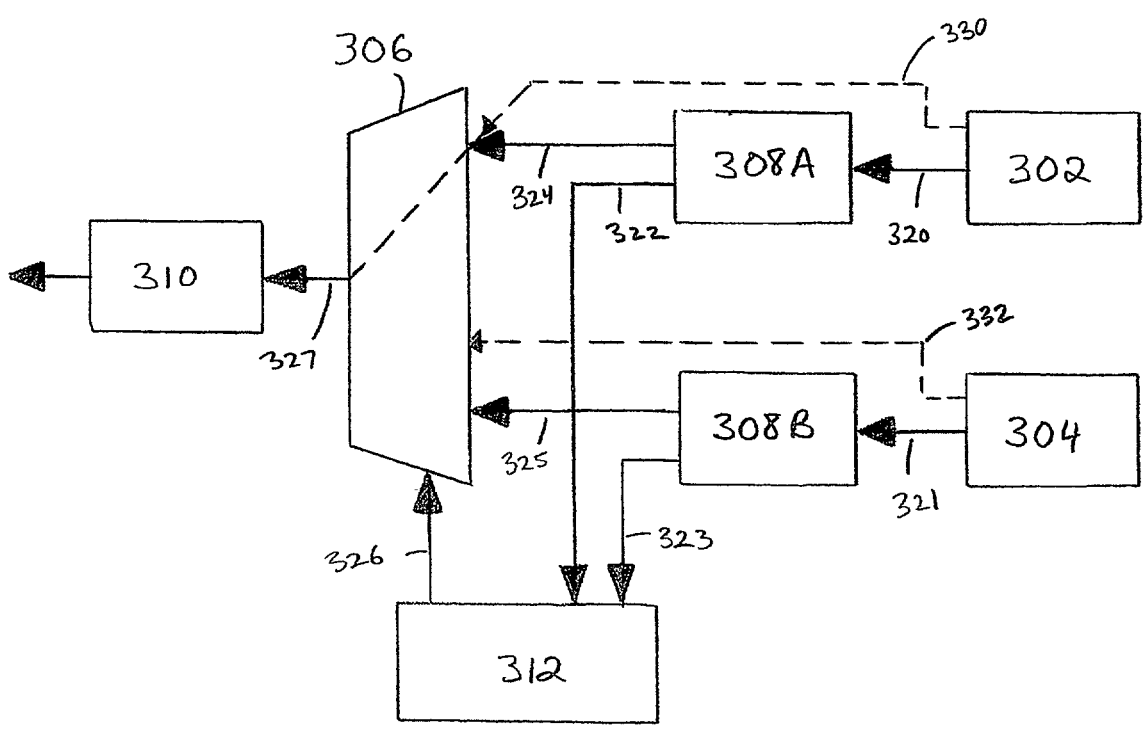
FIG. 3 is a block diagram of the aspects of the routing switch of an embodiment of the invention.

Referring to FIG. 3, an embodiment in circuit 300 addresses deficiencies in the prior art. Circuit 300 comprises primary source 302, redundant source 304, multiplexer 306, validation module 308A, validation module 308B, processing block 310, assessment module 312 and links 320–327.

Herein, circuit 300 has a dedicated validation module 308A for primary source 302 and a dedicated validation module 308B for redundant source 304. Link 320 connects primary source 302 with validation module 308A and link 321 connects redundant source 304 with validation module 308B. Accordingly, data provided by primary source 302 is continually evaluated by validation module 308A. Similarly, data provided by redundant source 304 is continually evaluated by validation module 308B. It will be appreciated that a single validation module may monitor both primary source 302 and redundant source 304. In such a situation, validation modules 308A and 308B are validation sub-modules of the single validation module.

In this embodiment, validation modules 308A and 308B have continuous and up-to-date status on the respective health of primary source 302 and redundant source 304.

In order to assess the results of each validation module 308A and 308B, reports regarding the output from validation modules 308A and 308B are sent to assessment module 312 through links 322 and 323 respectively. Accordingly, the reports are processed by assessment module 312 to select the source having the better health. It will be appreciated that the switching may be done as soon as it is determined that the health of the redundant source is better than the primary source. Other switching triggers may also be used in other embodiments. In the embodiment, validation modules 308A and 308B provide data from primary source 302 and redundant source 304 to multiplexer 306 through links 324 and 325 respectively. Once assessment module 312 selects the source with the better health, it provides an appropriate control signal through link 326 to multiplexer 306 to select the better source. Accordingly, data from the better source is allowed to flow through multiplexer 306 and is provided to processing module 310 by link 327. In the illustrated example, the validation reports from validation module 308A and 308B have been assessed by assessment module 312 and assessment module 312 has determined that primary source 302 is the better source. Accordingly, assessment module 312 provides control signals to multiplexer 306 to allow the data from primary source 302 to flow through multiplexer 306.

An alternative embodiment is illustrated in FIG. 3 using links 330 and 332. In the alternative embodiment, data from primary source 302 and redundant source 304 flows directly to multiplexer 306. Data does not flow from primary source 302 and redundant source 304 through validation modules 308A and 308B and links 324 and 325 to arrive at multiplexer 306. Other aspects of circuit 300 are as described above.

Routing switch 100 encompasses the source selection scheme of circuit 300 of FIG. 3 at several points as data, in the ingress direction, is transmitted from CPEs 102 to I/O cards 122, to HLPCs 120 and to HFICs 118. A similar set of tests are performed in the egress direction.

Figure 4:
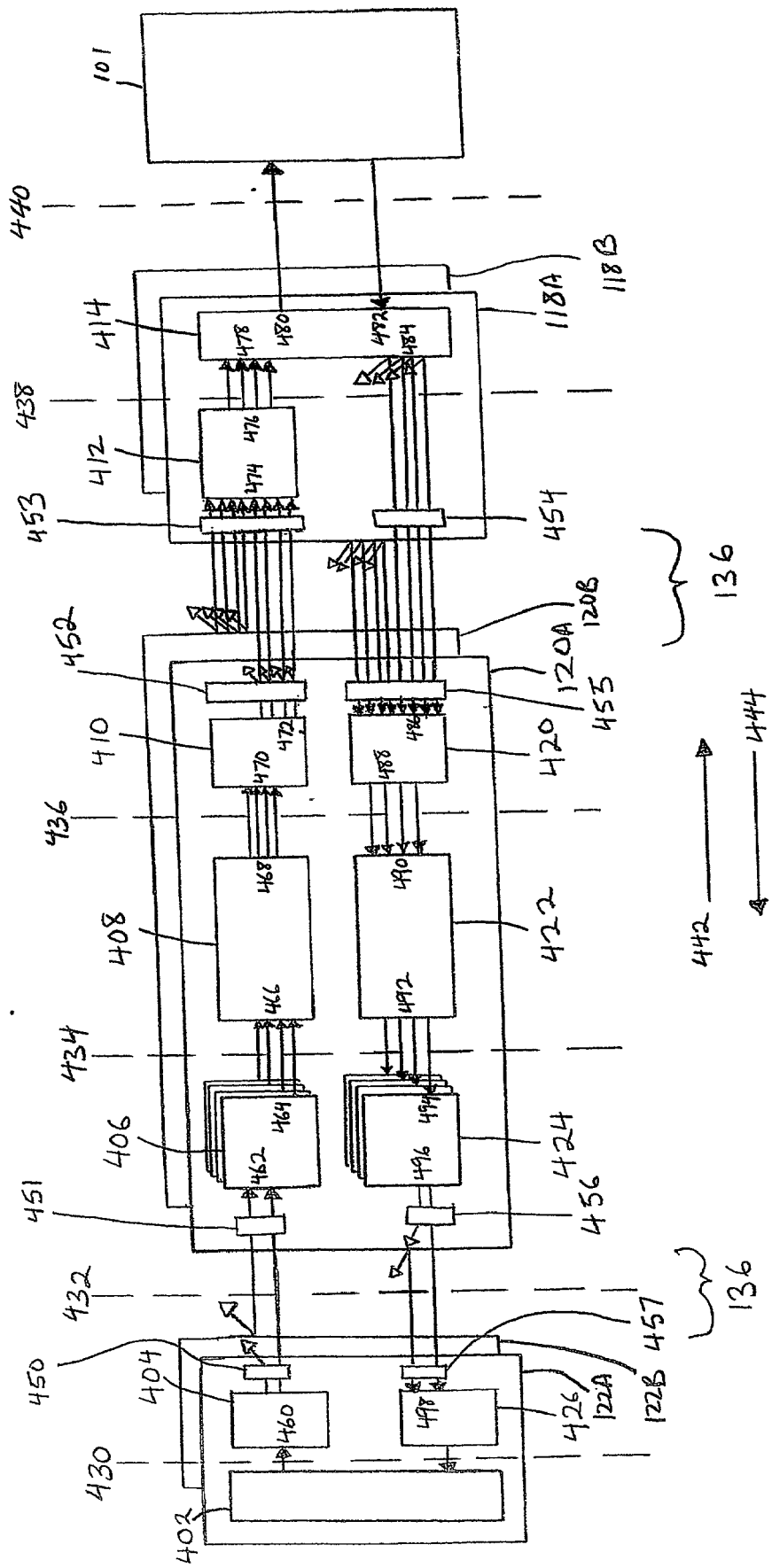
FIG. 4 is a block diagram of the flow of cells between elements of an I/O shelf of the routing switch of FIG. 1A.

First, referring to FIG. 4, a layout of elements of I/O shelf 104A of routing switch 100 is provided. I/O shelf 104A has I/O cards 122A and 122B, HLPCs 120A and 120B and HFICs 118A and 1181B connected to provide 1+1 redundancy as is shown in FIG. 11B. Active I/O card 122A, HLPC 120A and HFIC 118A, are shown connected in the foreground with their respective sub-elements. Inactive I/O card 122B, HLPC 120B and HFIC 118B are shown in the background. Data flow to active I/O card 122A, HLPC 120A and HFIC 118A is indicated by solid-head arrows while data flow to inactive I/O card 122B, HLPC 120B and HFIC 118B is indicated by hollow-head arrows. I/O cards 122A and 122B comprise framer 402, Automatic Protection Source (APS) blocks 404 and 426, serializer 450 and deserializer 457. HLPCs 120A and 120B comprise Field Programmable Gate Arrays (FPGAs) 406, 410, 420 and 424, ASICs 408 and 422, serializers 452 and 456 and deserializers 451 and 455. HFICs 118A and 118B comprise FPGA 412, ASIC 414, serializer 454 and deserializer 453.

In the ingress direction, as indicated by arrow 442, data from CPEs 102 is transmitted to both active and inactive I/O cards 122A and 122B over optical connections. It is known that optical connections and interfaces where electrical signals are converted to optical signals are points at which errors may be introduced into the datastream. Accordingly, these errors need to be identified and processed. Framer 402 on active I/O card 122A receives and extracts the cells from the datastream. The data then flows from framer 402 to APS block 404.

APS block 404 then sends the data to serializer 450 which converts the data into electronic signals for LVD signalling. The converted-data is sent to both active and inactive HLPCs 120A and 120B through midplane connections 136. Similarly, APS block 404 on inactive I/O card 122B also sends the data to a serializer 450. The datastream leaves 110 cards 122A and 122B over signals carried through midplane connection 136 and is transmitted to both active and inactive HLPCs 120A and 120B. The data arrives at deserializer 451 in both active and inactive HLPCs 120A and 120B. Deserializer 451 converts the data back into its original parallel format and sends it to FPGA 406. In the embodiment, FPGA 406 comprises four separate cards to enhance capacity of FPGA resources. Four connections are used between other components in FIG. 4 to enhance capacity of the connections between components. It will be appreciated that the conversion and transmission of LVD signalling by serializer 450 and deserializer 451 is another point where errors can be introduced into the datastream. FPGAs 406 are programmed to encompass the functionality of multiplexer 306 and validation modules 308A and 308B of FIG. 3. FPGAs 406 in HLPC 120A and 120B communicate with assessment module 312 to select I/O card 122A or 122B as the primary source based on the detection of errors in the data which are reported to validation modules 308A and 308B.

Next, data from the selected primary source, I/O card 122A, is transmitted from FPGA 406 to ASIC 408 and then to FPGA 410. FPGA 410 on active HLPC 120A sends the data to serializer 452 which converts the data for LVD signalling. The converted datastream is transmitted from serializer 452 over midplane connection 136 to active and inactive HFICs 118A and 118B. Similarly, FPGA 410 on inactive HLPC 120B sends the data to a serializer 452 and the serialized data is sent to active and inactive HFICs 118A and 118B.

At HFICs 118A and 118B, the serialized data is received by a deserializer 453 which converts the data back to its original parallel format for use by HFICs 118A and 118B. As with the interface between I/O cards 122A and 122B and HLPCs 120A and 120B, it will be appreciated that this is another point where errors can be introduced into the datastream. The data is then sent to FPGAs 412 in HFICs 118A and 118B. FPGAs 412 are also programmed to encompass the functionality of multiplexer 306 and validation modules 308A and 308B of FIG. 3. FPGAs 412 in HFICs 118A and 118B communicate with assessment module 312 which selects HLPC 120A or 120B as the primary source based on the detection of errors in the data which are reported to validation modules 308A and 308B. Finally, data from the selected primary source, HLPC 120A, is provided to ASIC 414. ASIC 414 converts the data into an optical signal format suitable for engaging the optical transmission devices (not shown) to send the data over an optical connection to switching core 101.

Similarly, in the egress direction as indicated by arrow 444, validation is performed at several stages in the data path. Switching core 101 sends data over an optical connection to active HFIC 118A and inactive HFIC 118B. As with the optical connections from CPEs 102, the conversion of the datastream from electrical values to optical signals and transmission of the optical signals over fibre may introduce errors into the datastream. The data from switching core 101 arrives at ASIC 414 in HFICs 118A and 118B. The data is then sent to serializer 454 which converts the electrical signals to LVD signalling. The converted data is sent to a deserializer 455 in both active HLPC 120A and inactive HLPC 120B over midplane connections 136. Deserializer 455 converts the data back to its original parallel format at appropriate electrical values for HLPCs 120A and 120B and sends it to FPGA 420. As before, this is another point where errors can be introduced into the datastream. FPGAs 420, in communication with assessment module 312, choose HFIC 118A or 118B to be the primary source based on the detection of errors in the data which are reported to validation modules 308A and 308B. The data is transmitted from the selected primary source, HFIC 118A, to ASIC 422 and then to FPGA 424.

FPGA 424 on both active HLPC 120A and inactive HLPC 120B transmit the data to a serializer 456 to convert the data into LVD signalling. The converted data is transmitted from serializer 456 over midplane connections 136 to deserializer 457 in both active and inactive I/O cards 122A and 122B. At 110 cards 122A and 122B, deserializer 457 converts the data back to its original parallel format and sends it to APS block 426. The conversion point again provides another point where errors can be introduced into the datastream. APS blocks 426 on I/O cards 122A and 122B, in communication with assessment module 312, choose HLPC 120A or 120B as the primary source based on the detection of errors in the data which are reported to validation modules 308A and 308B. APS block 426 then transmits data from the selected primary source, HLPC 120A, to framer 402: Framer 402 then encapsulates the cells into a SONET datastream for transmission onto the optical medium.

Although the embodiment is illustrated in relation to a high speed peripheral shelf, I/O shelf 104A, it will be appreciated that I/O shelves 104B and 104C choose between active and inactive I/O cards 128, LPCs 130 and PFICs 132 and 134 in a manner employing a similar source selection scheme shown in circuit 300 of FIG. 3.

In the embodiment, as both the primary and redundant data sources are providing their respective validated datastreams to the selection module, when the selection module performs a switch from one datasource to another, the datastream from the new source is almost instantly available, subject to processing delays for effecting the switchover. Accordingly, when a redundant datasource provides its datastream to the selection module, until that datastream is required, the selection module simply discards or overwrites its buffers and registers receiving the redundant datastream.

In addition to the places mentioned above in FIG. 4 where errors may be introduced, errors may occur inside of and between elements of I/O cards 122, HLPCs 120 and HFICs 118. Errors may be introduced because of shorts and opens on printed circuit board tracks, cold solder joints, damaged devices and EMC interference. In transmission of data between and within I/O cards 122A and 122B, HLPCs 120A and 120B and HFICs 118A and 1188B, a number of checks are performed by the modules on the contents of the cells of the data. These checks are used to evaluate the validity of the data received by each respective element. The embodiment utilizes cyclic redundancy checks (CRCs) and modified CRCs. As data is transmitted from one location to another, a CRC can be used to detect errors that have been introduced into a block of data. In the embodiment, at a data check point, a module sending the data calculates the CRC number for a block of data and inserts the value into the header corresponding to the cell associated with the data. The module which receives the cell then checks the CRC value against the data received.

In a CRC calculation, the bits of a binary block of data represent coefficients of a binary polynomial. The sender multiplies the binary polynomial representing the block of data by $x^k$, k the degree of the generator polynomial, and divides the result by the generator polynomial. The remainder polynomial of this division has a degree smaller than the generator polynomial (degree of remainder polynomial<k). The number of bits required to represent the remainder polynomial is equal to the degree of the generator polynomial since one bit is required for each coefficient from degree k−1 to degree zero (0) in the remainder polynomial The sender appends a binary number representing coefficients of the remainder polynomial to the block of data transmitted to be checked by the receiver. The receiver receives the binary block of data with the appended binary number and divides its representative binary polynomial by the generator polynomial. A non-zero result indicates at least one error in the block of data introduced between the sender and the receiver.

A CRC calculation is used in the embodiment for the data and header portions of cells in the datastream. They include Data Check (DCHK) and Header Error Check (HEC). Each is described in turn followed by a description of their application in the embodiment. It will be appreciated that other methods of checking the integrity of the header information and payload information of a cell may be used other than the DCHK and HEC CRCs described below.

DCHK is a CRC performed over the payload portion of the cell to detect corruption of the payload in the cell. Errors in data in a cell, indicated by DCHK errors, do not necessarily warrant the cell to be discarded as higher layer protocols may be able to identify and correct the errors. DCHK is generated and checked at a number of points in I/O cards 122A and 122B, HLPCs 120A and 120B and HFICs 118A and 118B, described later. The embodiment uses the generator polynomial $x^4+x+1$, representing prime number 19 ($2^4+2^1+1$), for DCHK requiring four (4) bits to store the binary number representing the DCHK remainder polynomial.

DCHK-8 is a more complex form of CRC which uses an $8^{th}$ degree generator polynomial and can detect errors introduced by 8B/10B encoding. Accordingly, 8B/10B transmission protocols, e.g. Ethernet, used in the switch may be monitored by the embodiment. The embodiment uses the polynomial $x^8+x^2+x+1$, representing prime number 263 ($2^8+2^2+2^1+1$), for DCHK-8 testing requiring eight (8) bits to store the binary number representing the DCHK-8 remainder polynomial.

HEC is a CRC performed over the cell header. HEC is generated and checked at a number of points in I/O cards 122A and 122B, HLPCs 120A and 120B and HFICs 118A and 118B, described later. The number of bytes that HEC covers changes as the headers change and must be recalculated each time any field in the header or the size of the header changes. HEC errors indicate potential errors in routing information within the header and, as a result, these cells are discarded. The embodiment uses the polynomial $x^8+x^2+x+1$ for HEC testing requiring eight (8) bits to store the binary number representing the HEC remainder polynomial.

Figure 5:
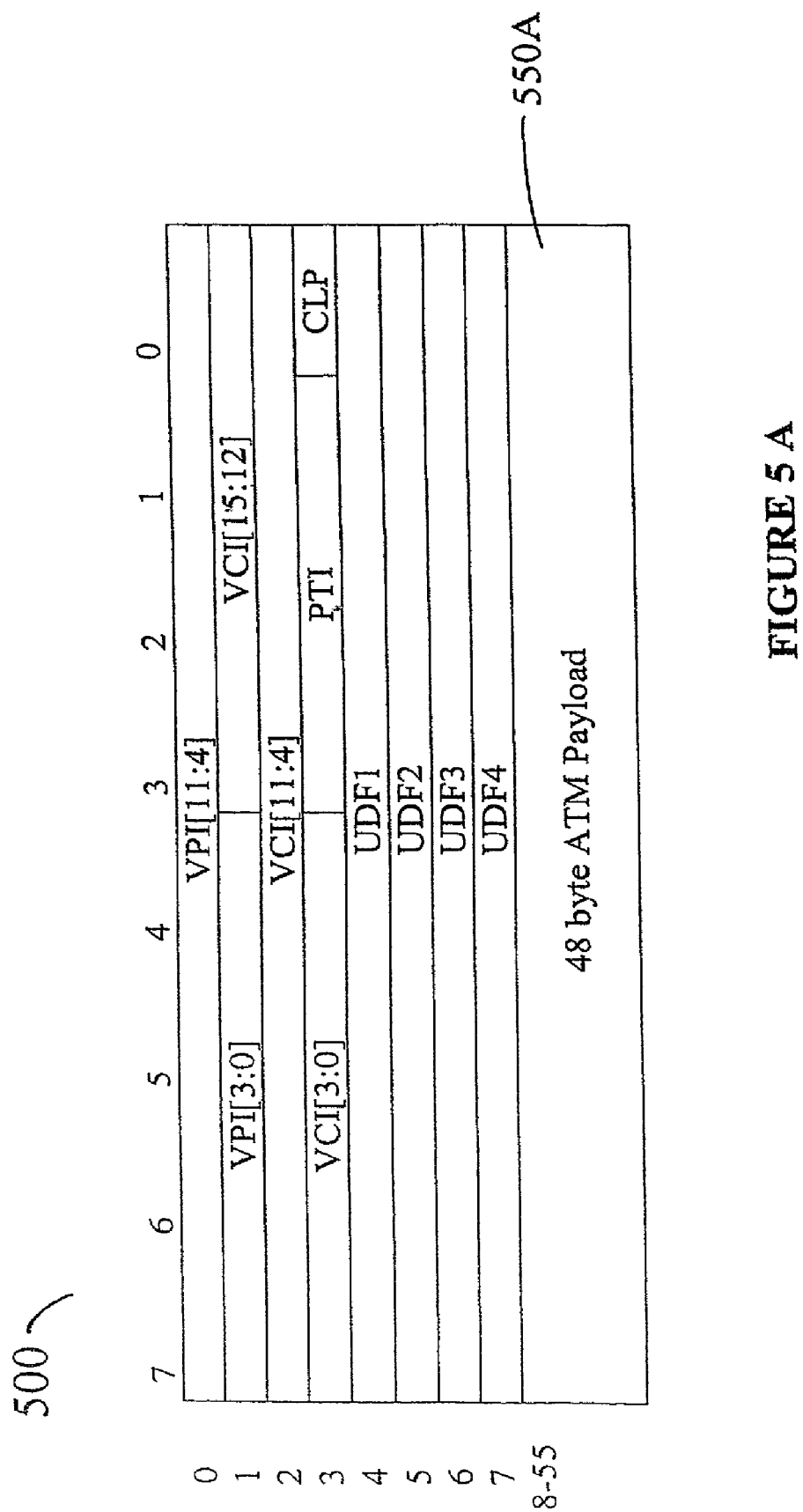
FIG. 5A is a table depicting the contents of a cell transmitted in the ingress direction between a framer and an Automatic Protection Source (APS) block in an I/O card in the I/O shelf of FIG. 4.
FIG. 5B is a table depicting the contents of a cell transmitted in the ingress direction between an APS block in an I/O card and a Field Programmable Gate Array (FPGA) in a line card in the I/O shelf of FIG. 4.
FIG. 5C is a table depicting the contents of a cell transmitted in the ingress direction between a FPGA and an Application Specific Integrated Circuit (ASIC) in a line card in the I/O shelf of FIG. 4.
FIG. 5D is a table depicting the contents of a cell transmitted in the ingress direction between an ASIC and a FPGA in a line card in the I/O shelf of FIG. 4.
FIG. 5E is a table depicting the contents of a cell transmitted in the ingress direction between a FPGA and an ASIC in a fabric interface card in the I/O shelf of FIG. 4.
FIG. 5F is a table depicting the contents of a cell transmitted in the ingress direction between a FPGA and an ASIC in a fabric interface cared in the I/O shelf of FIG. 4.
FIG. 5G is a table depicting the contents of a cell transmitted in the ingress direction between an ASIC in a fabric interface card in the I/O shelf and the switching core of FIG. 4.
FIG. 5H is a table depicting the contents of a cell transmitted in the egress direction between the switching core and an ASIC in a fabric interface card in the I/O shelf of FIG. 4.
FIG. 5I is a table depicting the contents of a cell transmitted in the egress direction between an ASIC in a fabric interface card and a FPGA in a line card in the I/O shelf of FIG. 4.
FIG. 5J is a table depicting the contents of a cell transmitted in the egress direction between a FPGA and an ASIC in a line card and in the I/O shelf of FIG. 4.
FIG. 5K is a table depicting the contents of a cell transmitted in the egress direction between an ASIC and a FPGA in a line card in the I/O shelf of FIG. 4.
FIG. 5L is a table depicting the contents of a cell transmitted in the egress direction between a FPGA in a line card and an APS block in an I/O card in the I/O shelf of FIG. 4.
FIG. 5M is a table depicting the contents of a cell transmitted in the egress direction between an APS block and a framer in an I/O card in the I/O shelf of FIG. 4.
Figure 5:
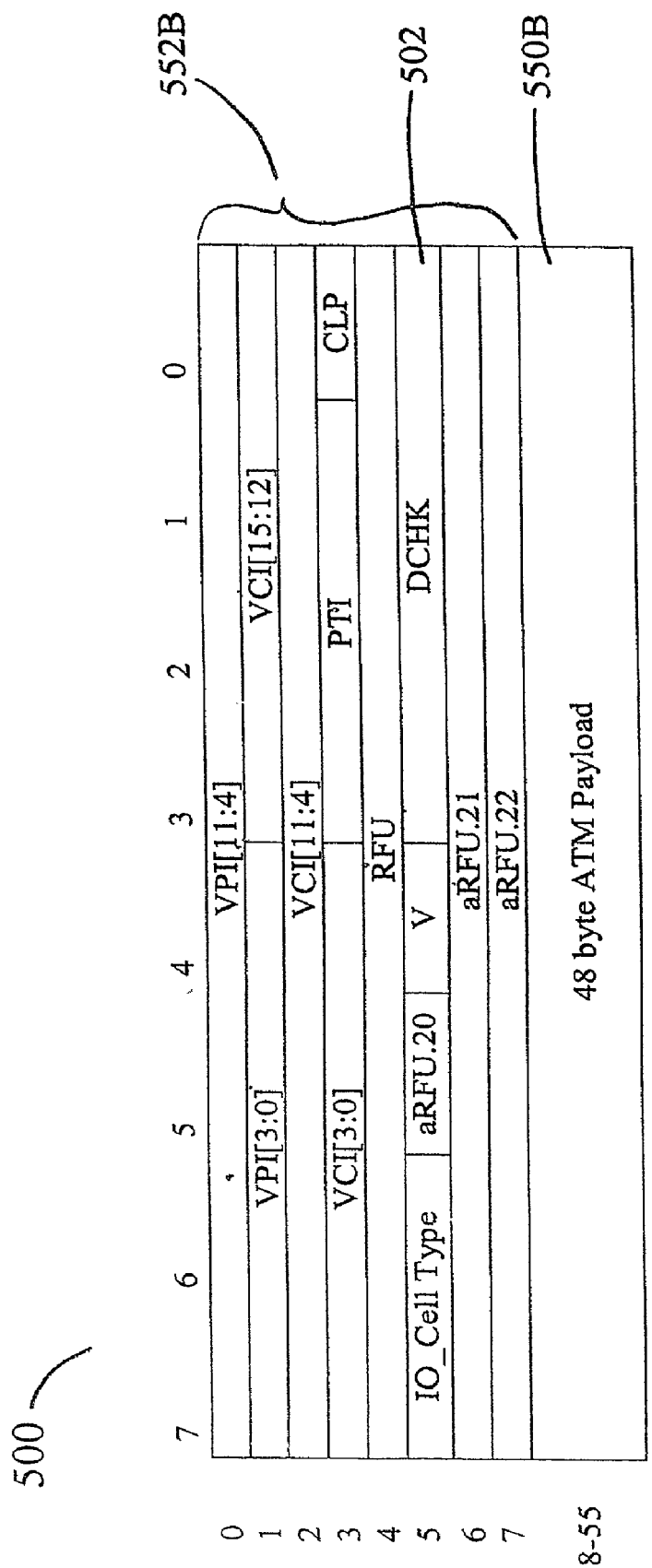
Figure 5:
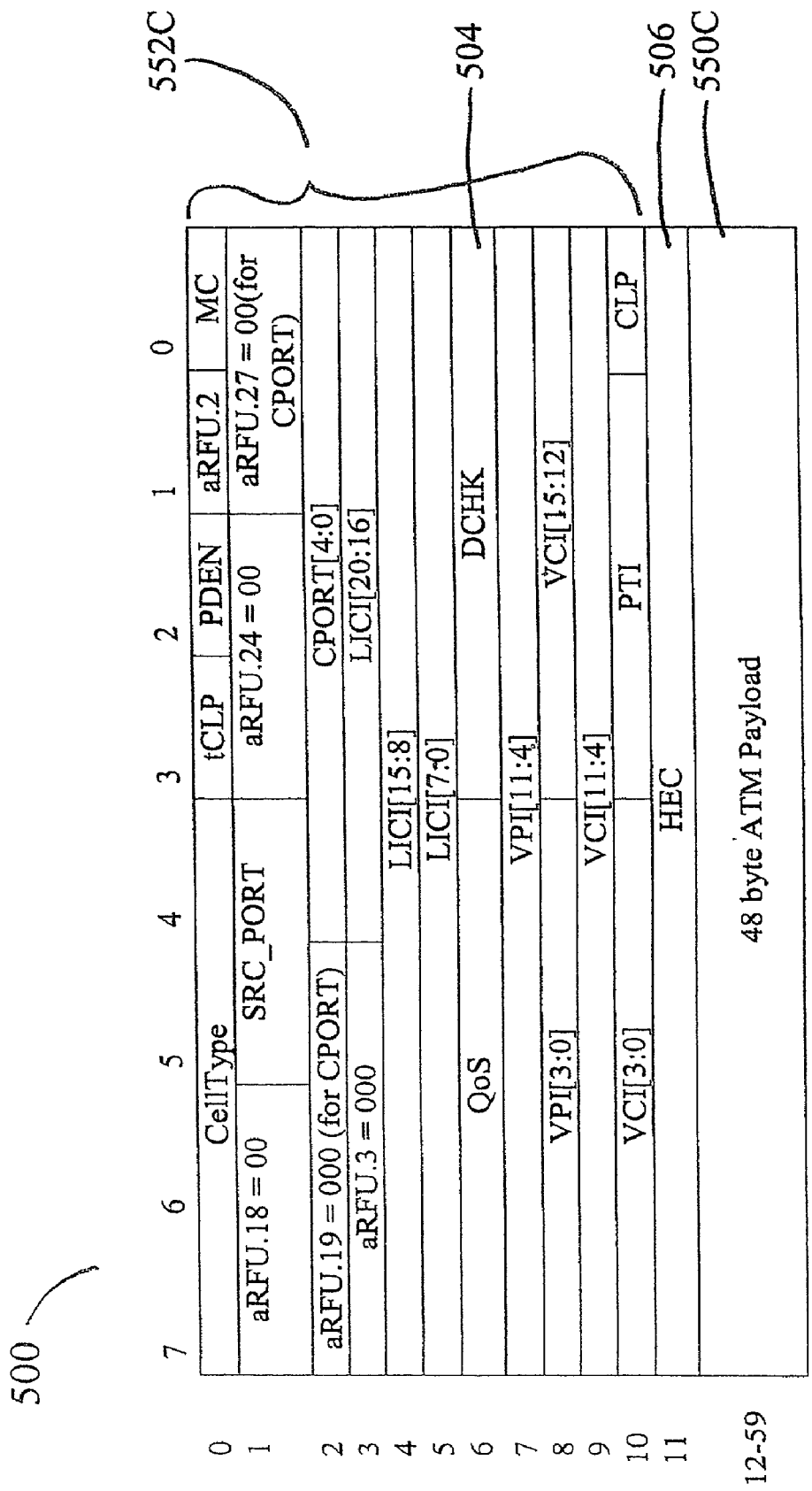
Figure 5:
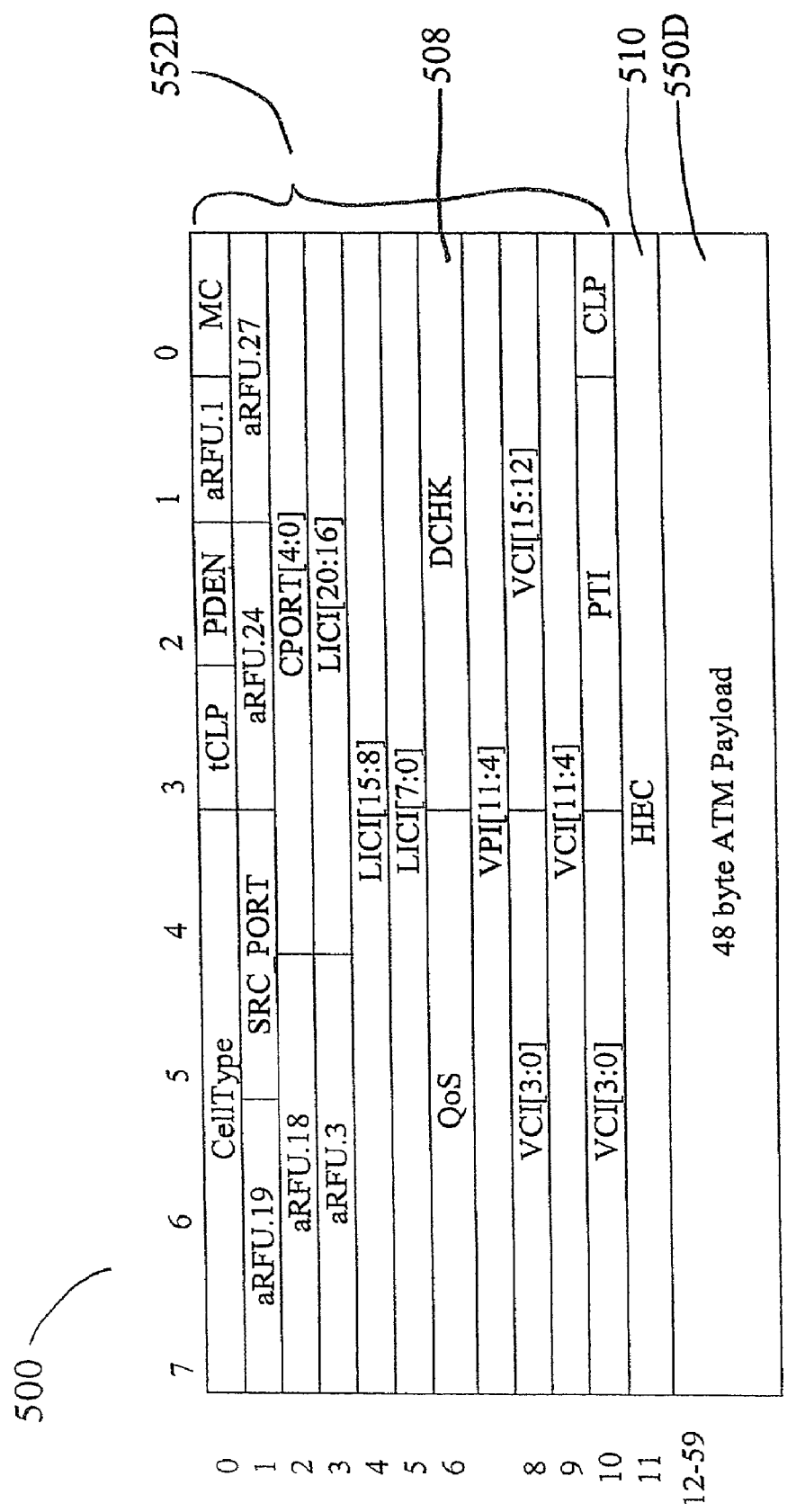
Figure 5:
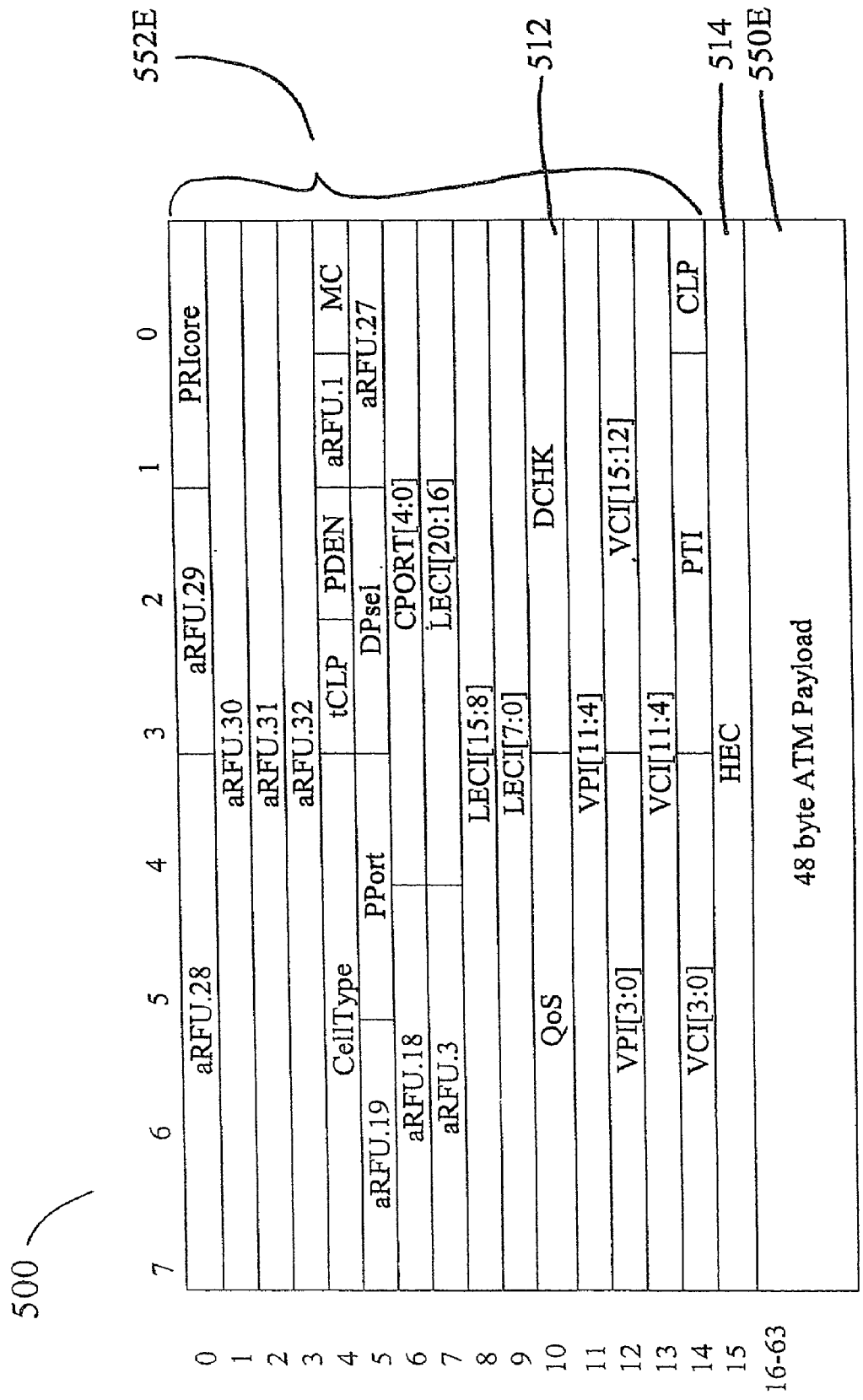
Figure 5:
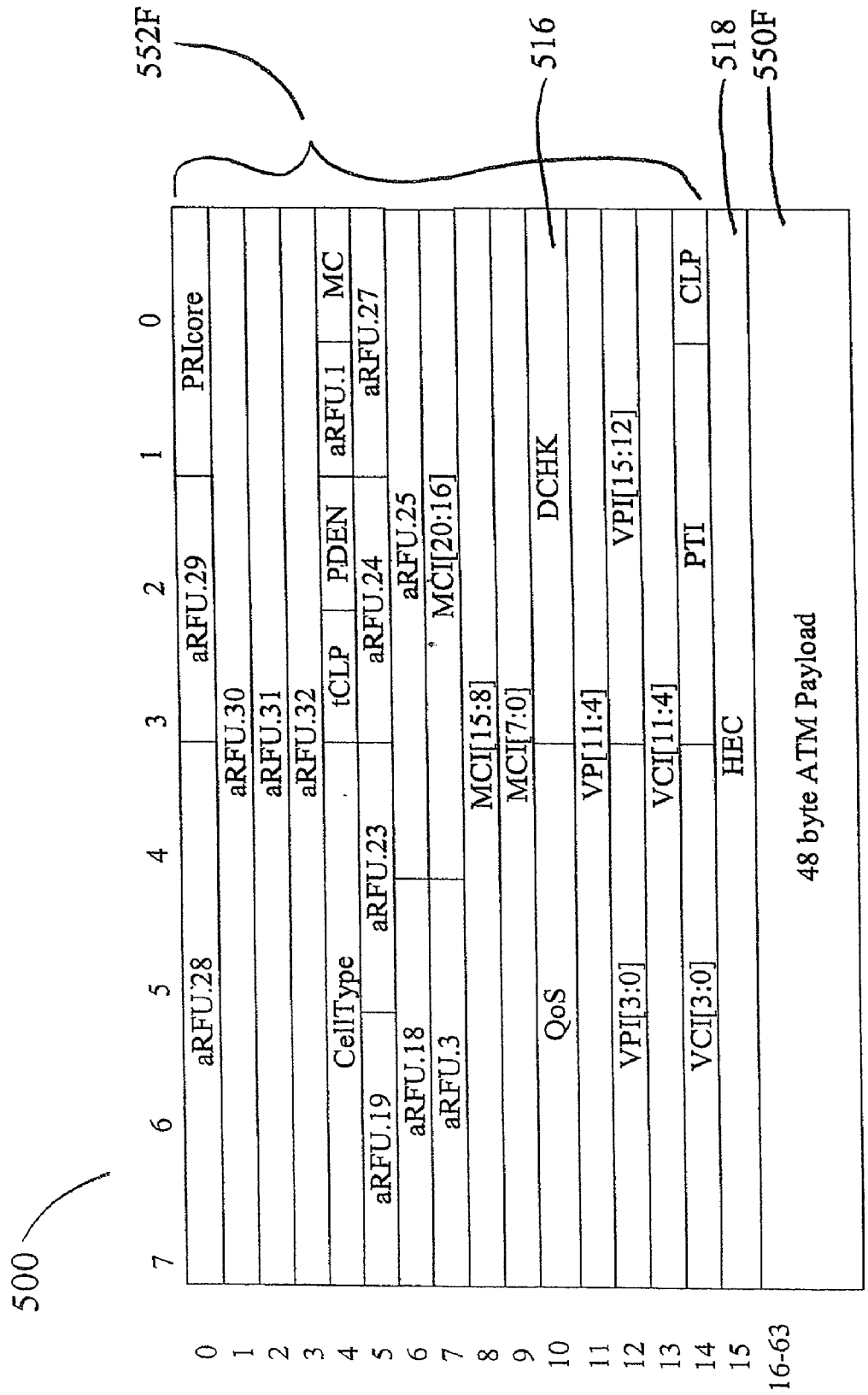
Figure 5:
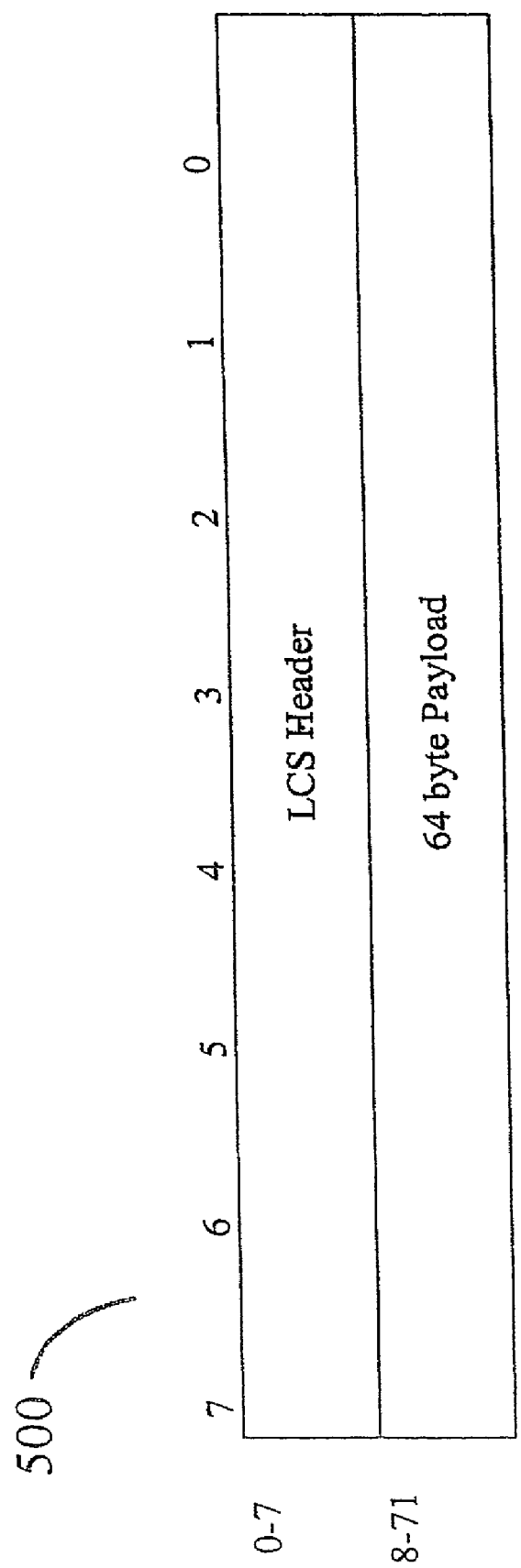
Figure 5:
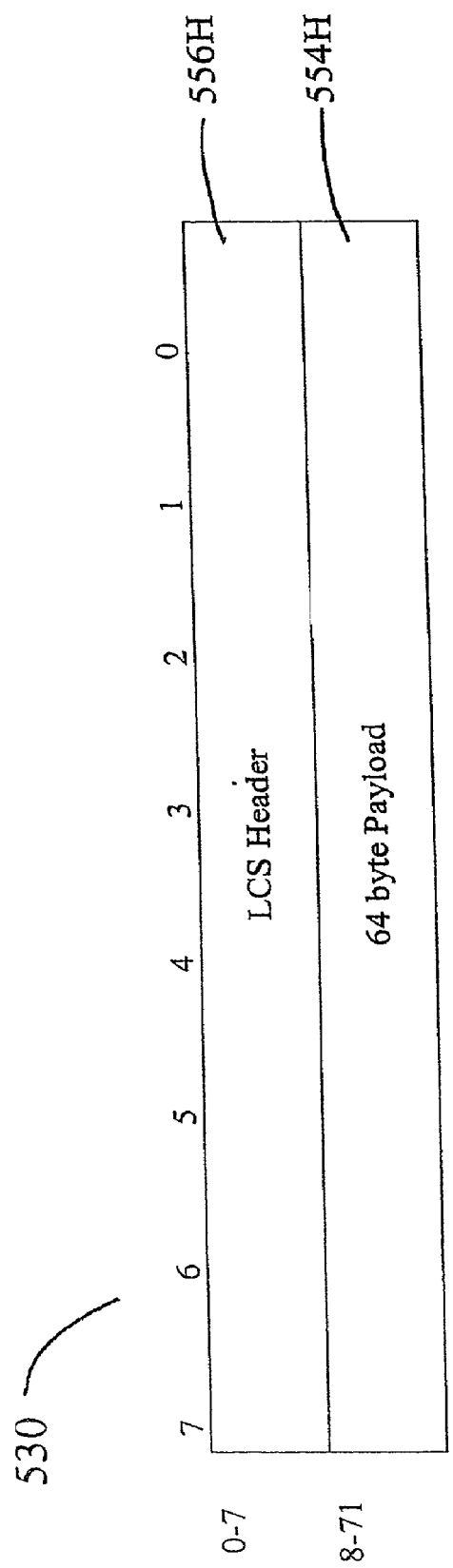
Figure 5:
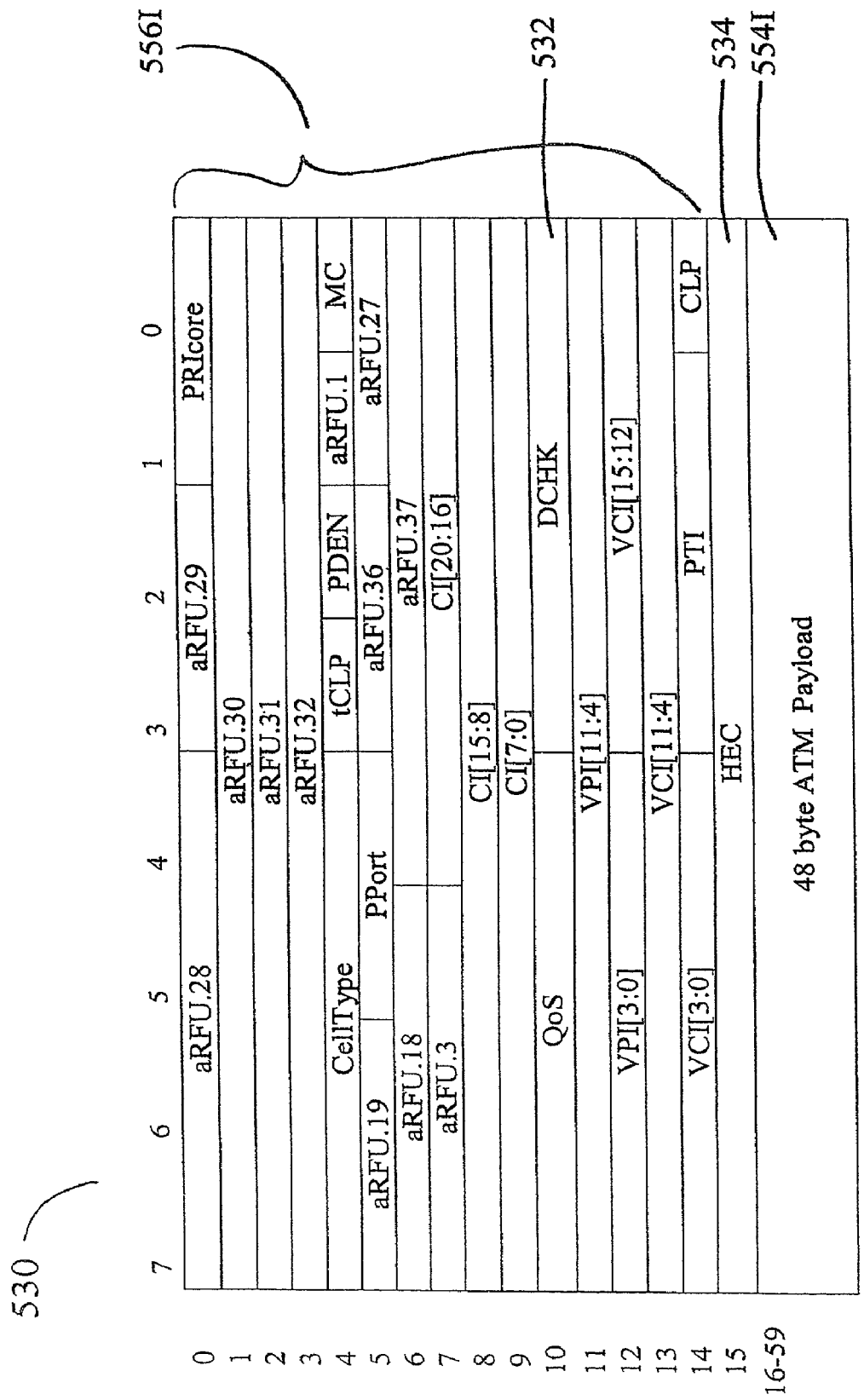
Figure 5:
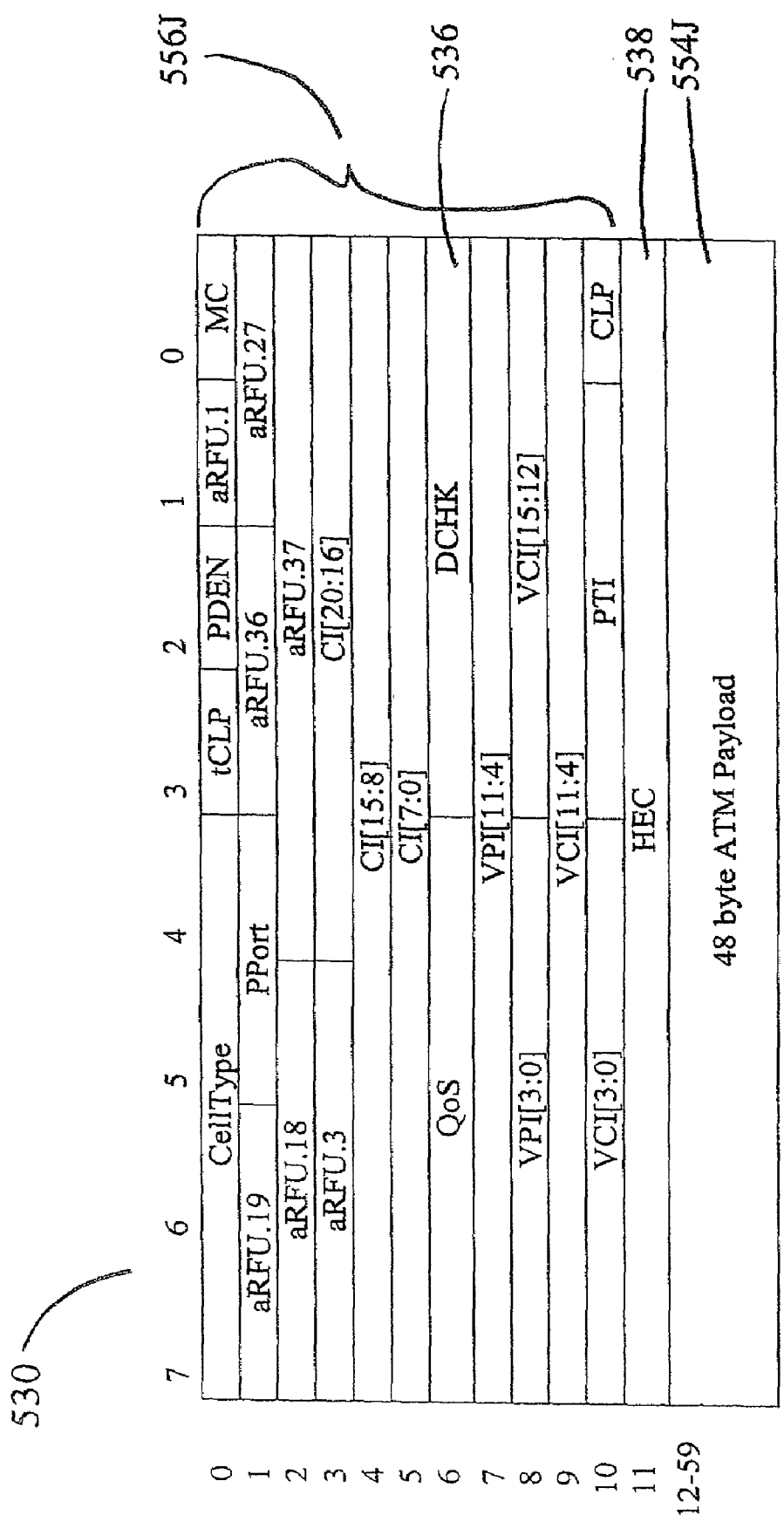
Figure 5:
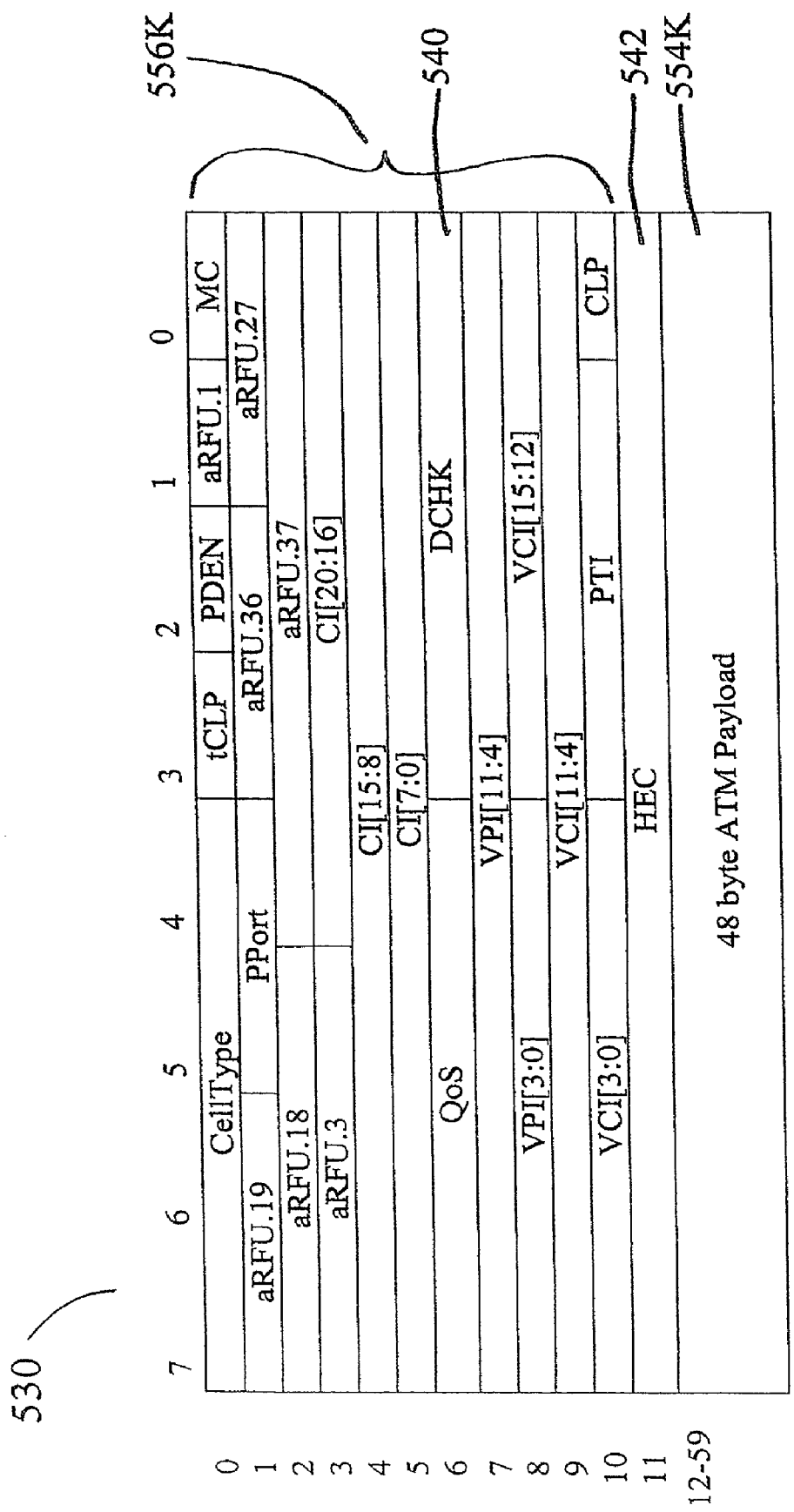
Figure 5:
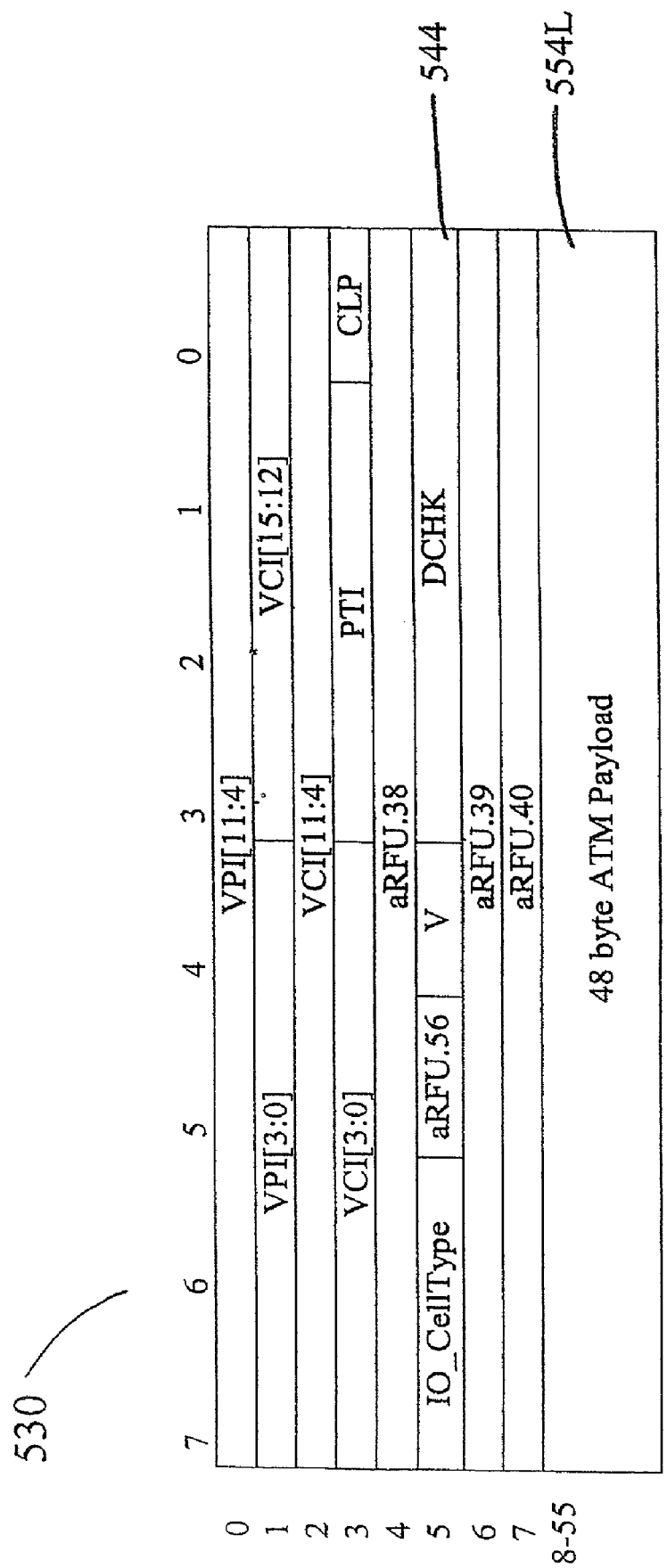
Figure 5:
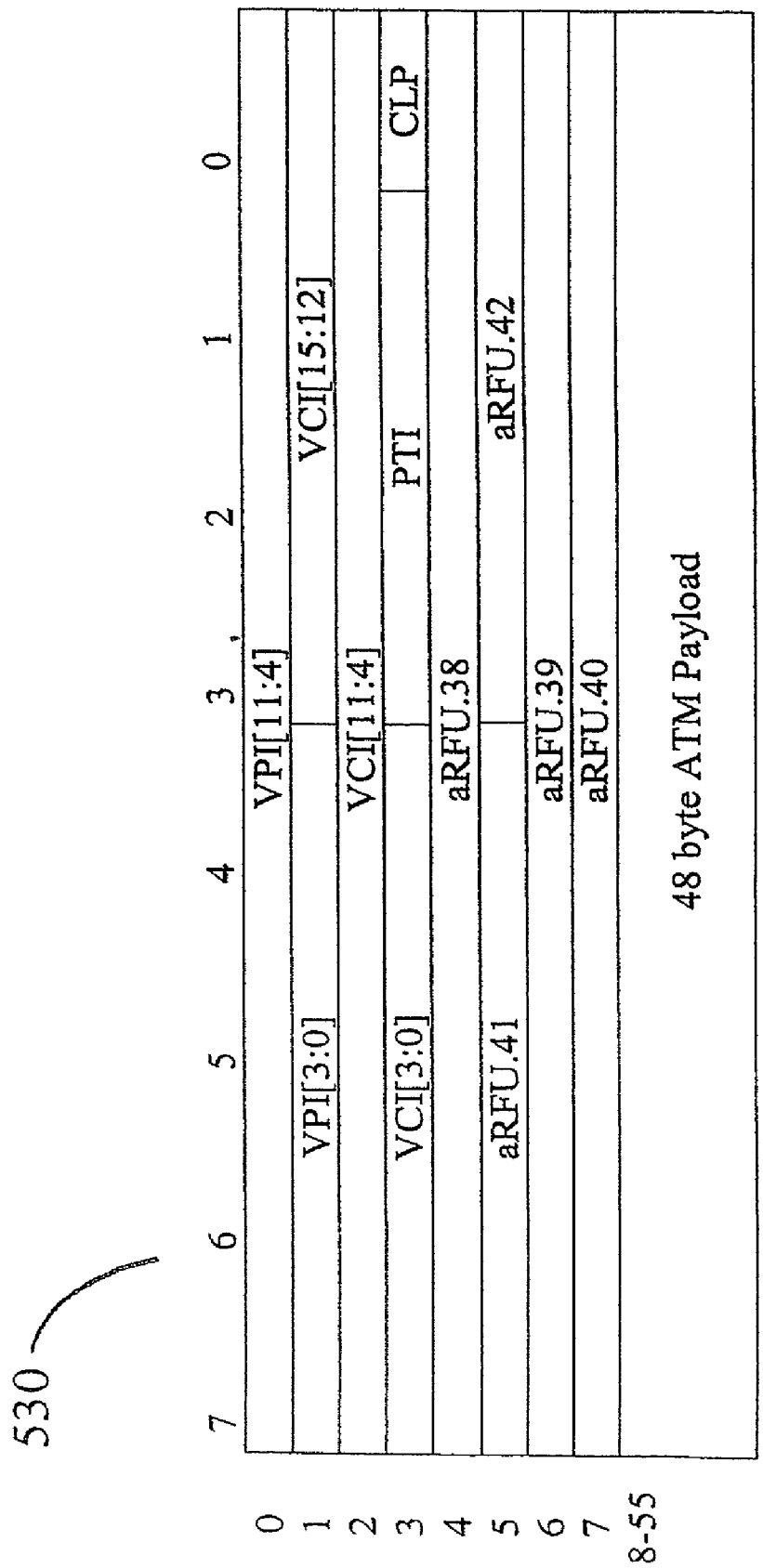

In the ingress direction, indicated by arrow 442, framer 402 outputs cell 500 at position 430 in FIG. 4 with a format as shown in FIG. 5A. APS block 404 receives cell 500 and generates a DCHK at point 460 of FIG. 4. The DCHK is calculated over payload portion 550A of cell 500 of FIG. 5A. DCHK is written to cell 500. FIG. 5B shows the format of cell 500 output from APS block 404 at position 432 of FIG. 4 with the binary number representing the DCHK remainder polynomial in location 502. DCHK requires four (4) bits of cell 500 to store its remainder polynomial given that its generator polynomial has degree four (4). FPGA 406 checks DCHK of location 502 at point 462 of FIG. 4. FPGA 406 checks the DCHK by dividing the representative polynomial of DCHK in location 502 appended onto payload portion 550B by the generator polynomial of the DCHK. A non-zero remainder indicates that at least one error has been introduced into payload portion 550B of cell 500 in FIG. 5B.

FPGA 406 generates a DCHK and a HEC at point 464 of FIG. 4. HEC is calculated over header portion 552B of cell 500 of FIG. 5B while DCHK is calculated over payload portion 550B of FIG. 5B. DCHK and HEC are written to cell 500. FIG. 5C shows the format of cell 500 exiting FPGA 406 at position 434 of FIG. 4 with DCHK in location 504 and HEC in location 506. HEC requires eight (8) bits of cell 500 to store its remainder polynomial given that its generator polynomial has degree eight (8). ASIC 408 checks the DCHK at point 466 of FIG. 4 in a similar manner as described earlier. ASIC 408 checks the HEC by dividing the representative polynomial of HEC in location 504 appended onto header portion 552C by the generator polynomial of the HEC. A non-zero remainder indicates that at least one error has been introduced into header portion 552C of cell 500 in FIG. 5C.

ASIC 408 generates a DCHK over payload portion 550C and a HEC over header portion 552C of FIG. 5C at point 468 of FIG. 4. DCHK and HEC are written to cell 500. FIG. 5D shows the format of cell 500 exiting ASIC 408 at position 436 of FIG. 4 with DCHK in location 508 and HEC in location 510. FPGA 410 checks the DCHK and HEC at point 470 of FIG. 4 in a similar manner as described earlier.

FPGA 410 generates a HEC over header portion 552D of FIG. 5D at point 472 of FIG. 4. HEC is written to cell 500. The previously generated DCHK remains in cell 500. FPGA 412 checks the DCHK and HEC at point 474 of FIG. 4 in a similar manner as described earlier.

FPGA 412 generates a DCHK over the payload portion and a HEC over the header portion of the cell it received from serializer 453 at point 476 of FIG. 4. DCHK and HEC are written to cell 500. FIG. 5E shows the format of cell 500 for ATM Unicast exiting FPGA 412 at position 438 of FIG. 4 with DCHK in location 512 and HEC in location 514. FIG. 5F shows the format of cell 500 for ATM Multicast exiting FPGA 412 at position 438 of FIG. 4 with DCHK in location 516 and HEC in location 518. ASIC 414 checks the DCHK and HEC at point 478 of FIG. 4 in a similar manner as described earlier.

For ATM Unicast, ASIC 414 generates a DCHK-8 over payload portion 550E and a HEC over header portion 552E of cell 500 of FIG. 5E at point 480 of FIG. 4. For ATM Multicast, ASIC 414 generates a DCHK-8 over payload portion 550F and a HEC over header portion 552F of cell 500 of FIG. 5F at point 480 of FIG. 4. DCHK and HEC are written to cell 500. FIG. 5G shows the format of cell 500 exiting ASIC 414 at position 440 of FIG. 4. Switching core 101 checks the DCHK-8 and HEC generated by ASIC 414 of FIG. 4 in a similar manner as described earlier.

In the egress direction, indicated by arrow 444, FIG. 5H shows the format of cell 530 exiting switching core 101 at position 440 of FIG. 4. ASIC 414 checks the DCHK-8 and HEC generated by switching core 101 at point 482 of FIG. 4 in a similar manner as described earlier.

ASIC 414 generates-a DCHK and a HEC at point 484 of FIG. 4. HEC is calculated over header portion 556H of cell 530 while DCHK is calculated over payload portion 554H of cell 530 of FIG. 5H. HEC and DCHK are written to cell 530. FIG. 5I shows the format of cell 530 exiting ASIC 414 at position 438 of FIG. 4 with DCHK in location 532 and HEC in location 534. FPGA 420 checks the DCHK and HEC at point 486 of FIG. 4 in a similar manner as described earlier.

FPGA 420 generates a HEC over header portion 556I of FIG. 5I at point 488 of FIG. 4. HEC is written to cell 530. The previously generated DCHK remains in cell 530. FIG. 5J shows the format of cell 530 exiting FPGA 420 at position 436 of FIG. 4 with DCHK in location 536 and HEC in location 538. ASIC 422 checks the DCHK and HEC at point 490 of FIG. 4 in a similar manner as described earlier.

ASIC 422 generates a DCHK over payload portion 554J and a HEC over header portion 556J of FIG. 5J at point 492 of FIG. 4. HEC and DCHK are written to cell 530. FIG. 5K shows the format of cell 530 exiting ASIC 422 at position 434 of FIG. 4 with DCHK in location 540 and HEC in location 542. FPGA 424 checks the DCHK and HEC at point 494 of FIG. 4 in a similar manner as described earlier.

FPGA 424 generates a DCHK over payload portion 554K of FIG. 5K at point 496 of FIG. 4. DCHK is written to cell 530. FIG. 5L shows the format of cell 530 exiting FPGA 424 at position 432 of FIG. 4 with DCHK in location 544. APS block 426 checks the DCHK at point 498 of FIG. 4 in a similar manner as described earlier. APS block 426 outputs cell 530 at position 430 of FIG. 4 with a format as shown in FIG. 5M.

In addition to DCHK and HEC testing, routing switch 100 also performs parity checks on all datastreams and on all devices that access external memories. While parity checking is mostly redundant considering the DCHK and HEC checking performed, a parity check is valid when there is no data flow and therefore no DCHK or HEC test. Parity errors are reported to software via interrupts and status bits. In general, data with parity errors are not discarded. These checks are also used at each validation module 308A and 308B in a similar manner as described earlier.

The embodiment has validation modules 308A and 308B checking for runt cells from the primary and the redundant sources. Runt cells are caused when a spike appears in the clock signal used to time the sending of cells between elements in I/O shelf 104A. As the main clock signal is used by the system to indicate the beginning of a cell, the spike falsely indicates that a cell has been generated when the cell has not in fact been completed. This results in two runt cells, the first containing the data gathered before the spike occurred and the second containing the remaining data from the cell. Runt cells are detected by counting the bytes of the cells and by looking at control signals. Runt cells are discarded.

Errors detected through the tests performed on the cells, including DCHK, DCHK-8, HEC, parity and runt cell tests, are reported to assessment module 312. Assessment module 312, combined with validation modules 308A and 308B, monitor errors on both active and inactive I/O cards 122, HLPCs 120 and HFICs 118 and only switch the primary and the redundant source if the relative health of the redundant source is superior to the primary source.

Assessment module 312 uses a scoring system to track the relative health of active and inactive I/O cards 122A and 122B, HLPCs 120A and 120B and HFICs 118A and 118B. The scoring system ranks errors in the header information detected by a HEC test as more serious than DCHK or parity test errors since these errors result in the cell being discarded. Monitoring the health of both the primary and redundant sources results in avoidance of faults caused by a switchover to an inferior redundant source in routing switch 100. Additionally, assessment module 312 can identify when an inactive card is not operational and can direct an operator to replace the inactive card.

In the embodiment, assessment module is a CPU programmed to implement the demerit system and to direct multiplexer 306 to use the chosen source as primary source 302.

It is noted that those skilled in the art will appreciate that various modifications of detail may be made to the present embodiment, all of which would come within the scope of the invention.

We claim:

1. A source selection system in a communication switch having active and redundant data flow paths, said source selection system, comprising:

a plurality of corresponding datasources operating independently and outputting in parallel the same data subject to data transmission errors that may be different for each of said datasources;

one of said corresponding datasources being selected as an active datasource, wherein the data output thereby is used as active data for onward transmission over the active data flow path within said switch, and the other of said corresponding datasources serving as a redundant datasource wherein the data output thereby acts as substitute data for use in the event of inadequate operational performance of said active datasource;

a validation module associated with said plurality of corresponding datasources adapted to monitor each of said datasources for transmission errors and provide information relating to said transmission errors;

an assessment module receiving said information from said validation module and assessing operational performance of each of said datasources based on said information to determine which of said data sources has better operational performance; and a source selector responsive to instructions from said assessment module to change the datasource selected as said active datasource to a new one of said corresponding datasources when said assessment module determines that said new one of said datasources has a better operational performance than said one of said datasources.

2. The source selection system as claimed in claim 1, wherein said validation module comprises a plurality of validation sub-modules, each one of said plurality of validation sub-modules associated respectively with one of said plurality of datasources.

3. The source selection system as claimed in claim 2, wherein said validation module performs an integrity check on data transmitted by said datasources to provide information relating to transmission errors.

4. The source selection system as claimed in claim 3, wherein said assessment module evaluates severity of said transmission errors provided in said information and causes said source selector to select said active datasource based on said severity of said transmission errors.

5. The source selection system as claimed in claim 4, wherein said integrity check on said data comprises a parity check and a cyclic redundancy check.

6. The source selection system as claimed in claim 5, wherein said integrity check is performed on a payload portion of said data.

7. A source selection system as claimed in claim 6, wherein said integrity check is performed on a header portion of said data.

8. The source selection system as claimed in claim 7, further comprising a plurality of processing cards and an interface card in said communication switch, said plurality of processing cards providing said plurality of datasources, and said source selector operating at an input to said interface card.

9. The source selection system as claimed in claim 8, wherein said integrity check is performed upon said data being received by at least one of said processing cards of said communication switch.

10. The source selection system as claimed in claim 9, wherein said source selector is a multiplexer.

11. A method of selecting a datasource in a communication switch, wherein a plurality of datasources output the same data in parallel subject to transmission errors that may be different for each datasource, said method comprising the steps of:
monitoring said datasources for transmission errors to provide information relating to said transmission errors; and
continually assessing operational performance of each of said datasources based on said information to determine which datasource has the better operational performance; and
continually selecting as an active datasource a first datasource currently having better operational performance, wherein the data output thereby is used as active data for onward transmission while said selected datasource continues to have better performance, and a second of said datasources serving as a redundant datasource, and wherein the second of said datasources becomes the active datasource if the second of said datasources has better performance than the first of said datasources.

12. The method as claimed in claim 11, wherein said monitoring of said first datasources for transmission errors is executed by performing an integrity check on data originating from said datasources.

13. The method as claimed in claim 12, wherein the active datasource is identified based on the severity of said transmission errors.

14. The method as claimed in claim 13, wherein said integrity check on said data comprise parity checks and cyclic redundancy checks.

15. The method as claimed in claim 14, wherein said integrity check is performed on a payload portion of said data.

16. The method as claimed in claim 15, wherein said integrity check is performed on a header portion of said data.

17. In a communication switch including active and redundant data flow paths a source selection system comprising:
a first communication module comprising a first chain of successive data processing elements outputting data,
a second communication module comprising a second chain of successive data processing elements outputting data;
each of said data processing elements in said first communication module having a corresponding data processing element in said second communication module, whereby successive pairs of data processing elements in said first and second communication modules output the same data in parallel subject to transmission errors which may be different for each data processing element of said successive pairs of data processing elements;
cross connects for cross-connecting an output of at least some of said data processing elements in each of said first and second chains with an input of a following said data processing element in the other of said first and second chains;
a validation module associated with said data processing elements adapted to monitor said data processing elements for transmission errors in the data output thereby and provide information relating to said transmission errors;
an assessment module receiving said information from said validation module and assessing an operational performance of said data processing elements based on said information to determine which of said data processing elements has better operational performance; and
a source selector responsive to instructions from said assessment module to select as an upstream active data source for a particular said data processing element one of said data processing elements of a preceding pair of said data processing elements based on the operational performance of said data processing elements in said preceding pair, the other of said data processing elements of said preceding pair of said data processing elements serving as an upstream redundant source until the operational performance of said upstream active source becomes worse than said upstream redundant data source, whereupon said source selector switches roles of said active and redundant data sources so that the datasource with the better operational performance becomes the active datasource of said preceding pair of data processing elements.

18. The source selection system as claimed in claim 1, wherein said assessment module continually instructs said source selector to select the datasource with the best operational performance.

* * * * *